US010462834B2

(12) United States Patent
Agarwal et al.

(10) Patent No.: US 10,462,834 B2
(45) Date of Patent: Oct. 29, 2019

(54) OFFLOADING THROUGH SIMPLIFIED MULTIFLOW

(71) Applicant: QUALCOMM Incorporated, San Diego, CA (US)

(72) Inventors: Ravi Agarwal, San Diego, CA (US); Sharad Deepak Sambhwani, San Diego, CA (US); Francesco Pica, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/975,047

(22) Filed: Dec. 18, 2015

(65) Prior Publication Data
US 2016/0337930 A1 Nov. 17, 2016

Related U.S. Application Data

(60) Provisional application No. 62/162,427, filed on May 15, 2015.

(51) Int. Cl.
*H04W 76/15* (2018.01)
*H04W 36/30* (2009.01)
(Continued)

(52) U.S. Cl.
CPC ........... *H04W 76/15* (2018.02); *H04W 28/08* (2013.01); *H04W 36/30* (2013.01); *H04W 8/22* (2013.01);
(Continued)

(58) Field of Classification Search
CPC ..... H04W 36/32; H04W 24/02; H04W 36/08; H04W 76/15; H04W 36/30; H04W 28/08; H04W 8/22; H04W 28/0236; H04W 36/22
(Continued)

(56) References Cited

U.S. PATENT DOCUMENTS 10,070,366 B2 * 9/2018 Munier ................. H04W 36/22
2006/0146749 A1 7/2006 Lundh et al.
(Continued)

FOREIGN PATENT DOCUMENTS

EP          3111700 A2     1/2017
WO    WO-2013/112189 A1   8/2013
WO    WO-2014/163697 A1  10/2014

OTHER PUBLICATIONS

International Search Report and Written Opinion—PCT/US2016/032121—ISA/EPO—dated Aug. 4, 2016. (19 total pages).
(Continued)

*Primary Examiner* — Michael Y Mapa
(74) *Attorney, Agent, or Firm* — Arent Fox, LLP

(57) ABSTRACT

Systems, methods, and apparatuses for improved traffic management in wireless communications are disclosed. Aspects of the present disclosure provide real-time assessments to a network by leveraging measurement reports from user equipment (UE). In some aspects, the network utilizes channel quality indicator (CQI) information from each of a serving cell and a neighboring cell to identify UE capabilities and expected UE performance prior to either offloading or rerouting traffic to the UE. Accordingly, based on the received CQI information and a greater understanding of the anticipated UE performance, the radio network controller (RNC) may be better equipped to determine whether to offload and/or reroute the traffic scheduled for transmission to the UE via the neighboring cell or the serving cell.

19 Claims, 6 Drawing Sheets

(51) Int. Cl.
*H04W 28/08* (2009.01)
*H04W 8/22* (2009.01)
*H04W 28/02* (2009.01)
*H04W 36/22* (2009.01)
*H04W 36/08* (2009.01)

(52) U.S. Cl.
CPC ........ *H04W 28/0236* (2013.01); *H04W 36/08* (2013.01); *H04W 36/22* (2013.01)

(58) Field of Classification Search
USPC .... 455/115.3, 134–135, 161.3, 226.2–226.3, 455/422.1, 436–445, 448–453, 513; 370/331–332
See application file for complete search history.

(56) References Cited

U.S. PATENT DOCUMENTS

| | | | |
|---|---|---|---|
| 2007/0049278 A1 | 3/2007 | Lindoff et al. | |
| 2010/0027503 A1* | 2/2010 | Eravelli | H04W 36/02 370/331 |
| 2010/0067481 A1* | 3/2010 | Maeda | H04L 1/1874 370/331 |
| 2012/0149375 A1* | 6/2012 | Takubo | H04W 24/10 455/436 |
| 2013/0111038 A1* | 5/2013 | Girard | H04L 45/245 709/226 |
| 2013/0136106 A1* | 5/2013 | Shetty | H04W 36/14 370/331 |
| 2014/0022904 A1 | 1/2014 | Ahmad et al. | |
| 2014/0254559 A1* | 9/2014 | Tie | H04W 36/24 370/332 |
| 2014/0301399 A1 | 10/2014 | Sarkkinen et al. | |
| 2015/0111569 A1 | 4/2015 | Gupta | |
| 2015/0208290 A1* | 7/2015 | Seo | H04W 36/0072 370/331 |
| 2015/0271728 A1* | 9/2015 | Tie | H04W 24/10 370/236 |

OTHER PUBLICATIONS

Aruchamy L., "Analysis of Radio Access Network Buffer Filling Based on Real Network Data", Dec. 1, 2012 (Dec. 1, 2012), pp. 1-81, XP055579943, School of Computing Blekinge Institute of Technology 37179 Karlskrona Sweden—Retrieved from the Internet: URL: https://www.diva-portal.org/smash/get/diva2:833482/FULLTEXT01.pdf [retrieved on Apr. 10, 2019].

* cited by examiner

OFFLOADING THROUGH SIMPLIFIED MULTIFLOW

CLAIM OF PRIORITY UNDER 35 U.S.C § 119

The present Application for Patent claims priority to U.S. Provisional Application No. 62/162,427 entitled "OFFLOADING THROUGH SIMPLIFIED MULTI-FLOW" filed May 15, 2015, and assigned to the assignee hereof and hereby expressly incorporated by reference.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., an LTE system).

By way of example, a wireless multiple-access communications system may include a number of base stations, each simultaneously supporting communication for multiple communication devices, which may be otherwise known as user equipment (UEs), mobile devices or stations (STAs). A base station may communicate with the communication devices on downlink channels (e.g., for transmissions from a base station to a UE) and uplink channels (e.g., for transmissions from a UE to a base station).

As cellular networks have become more congested, operators are beginning to look at ways to meet the ever-growing user demands within the constraints of existing resources. One approach to meet such demand may include offloading traffic from an overloaded cell to a cell that is less congested. However, in conventional systems, the network lacks sufficient information to make an informed decision on whether or not to offload the UE to a less congested cell, and more importantly, accurately identifying which UEs to offload, if any. In particular, current cellular networks lack the ability to identify UE capabilities and anticipate expected UE performance if the UE is offloaded to the less congested neighboring cell.

For example, in some instances, although the neighboring cell may be less congested than the serving cell, the offloaded UE may experience higher interference or weaker signal at the neighboring cell due to the in ability of the offloaded UE to cancel or suppress stronger cell interference than it would have experienced had the UE stayed at the serving cell. Accordingly, it may be counter intuitive, in some situations, for the network to make decisions on offloading based on only cell loading.

SUMMARY

Systems, methods, and apparatuses for improved traffic management in wireless communications are disclosed. Aspects of the present disclosure provide real-time assessments to a network by leveraging measurement reports from user equipment (UE). In some aspects, the network utilizes channel quality indicator (CQI) information from each of a serving cell and a neighboring cell to identify UE capabilities and expected UE performance prior to either offloading or rerouting traffic to the UE. For example, a radio network controller (RNC) may be configured to receive a first CQI associated with a first cell (e.g., serving cell) having a first high speed downlink channel and a second CQI associated with a second cell (e.g., neighboring cell) having a second high speed downlink channel. In accordance with various aspects of the present disclosure, the RNC may utilize the first CQI and the second CQI to identify load distribution, signal strength, anticipated data rate, and/or UE capabilities (e.g., whether the UE is equipped with interference cancellation capabilities) at each of the first and second cell.

Accordingly, based on the received CQI information and a greater understanding of the anticipated UE performance, the RNC may be better equipped to determine whether to offload and/or reroute the traffic scheduled for transmission to the UE via the second cell (e.g., neighboring cell). In some aspects, the term "traffic" may refer to data packets, control signal packets, or combination thereof.

According to one aspect, a method for traffic management in a wireless communications system is disclosed. In some examples, the method may include receiving, at a RNC, a first CQI associated with a first cell having a first high speed downlink channel with a UE. The traffic stored at the RNC and scheduled for transmission to the UE may be routed by the RNC to the UE via the first cell. The method may further include receiving, at the RNC, a second CQI associated with a second cell having a second high speed downlink channel with the UE. In some aspects, the method may include determining, at the RNC, whether to reroute the data scheduled for transmission to the UE via the second cell based on receiving the first CQI and the second CQI. Additionally or alternatively, the method may include rerouting at least a portion of the data scheduled for transmission to the UE from the first cell to the second cell based on the determining.

According to another aspect, an apparatus for traffic management in a wireless communications system is disclosed. In some examples, the apparatus may include means for receiving, at a RNC, a first CQI associated with a first cell having a first high speed downlink channel with a UE. The traffic stored at the RNC and scheduled for transmission to the UE may be routed by the RNC to the UE via the first cell. The apparatus may further include means for receiving, at the RNC, a second CQI associated with a second cell having a second high speed downlink channel with the UE. In some aspects, the apparatus may include means for determining, at the RNC, whether to reroute the data scheduled for transmission to the UE via the second cell based on receiving the first CQI and the second CQI. Additionally or alternatively, the apparatus may include means for rerouting at least a portion of the data scheduled for transmission to the UE from the first cell to the second cell based on the determining.

According to yet another aspect, another apparatus for wireless communications is disclosed. The apparatus may comprise a transceiver, a memory configured to store instructions, and a processor communicatively coupled to the transceiver and the memory, the processor configured to execute the instructions to receive, at a RNC, a first CQI associated with a first cell having a first high speed downlink channel with a UE. The traffic stored at the RNC and scheduled for transmission to the UE may be routed by the RNC to the UE via the first cell. The processor may be further configured to execute the instructions to receive, at the RNC, a second CQI associated with a second cell having a second high speed downlink channel with the UE. In some aspects, the processor may be further configured to execute the instructions to determine, at the RNC, whether to reroute the data scheduled for transmission to the UE via the second cell based on receiving the first CQI and the second CQI. Additionally or alternatively, the processor may be further configured to execute the instructions to reroute at least a portion of the data scheduled for transmission to the UE from the first cell to the second cell based on the determining.

According to another aspect, a computer-readable medium storing code executable by a computer for wireless communications is disclosed. The compute-readable medium may include code for receiving, at a RNC, a first CQI associated with a first cell having a first high speed downlink channel with a UE. The traffic stored at the RNC and scheduled for transmission to the UE may be routed by the RNC to the UE via the first cell. The compute-readable medium may further include code for receiving, at the RNC, a second CQI associated with a second cell having a second high speed downlink channel with the UE. In some aspects, the computer-readable medium may include code for determining, at the RNC, whether to reroute the data scheduled for transmission to the UE via the second cell based on receiving the first CQI and the second CQI. Additionally or alternatively, the computer-readable medium may include code for rerouting at least a portion of the data scheduled for transmission to the UE from the first cell to the second cell based on the determining.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements (e.g., similar elements may have a same reference number followed by a different letter to differentiate between respective elements), where a dashed line may indicate an optional component, and in which.

DETAILED DESCRIPTION

Figure 1:
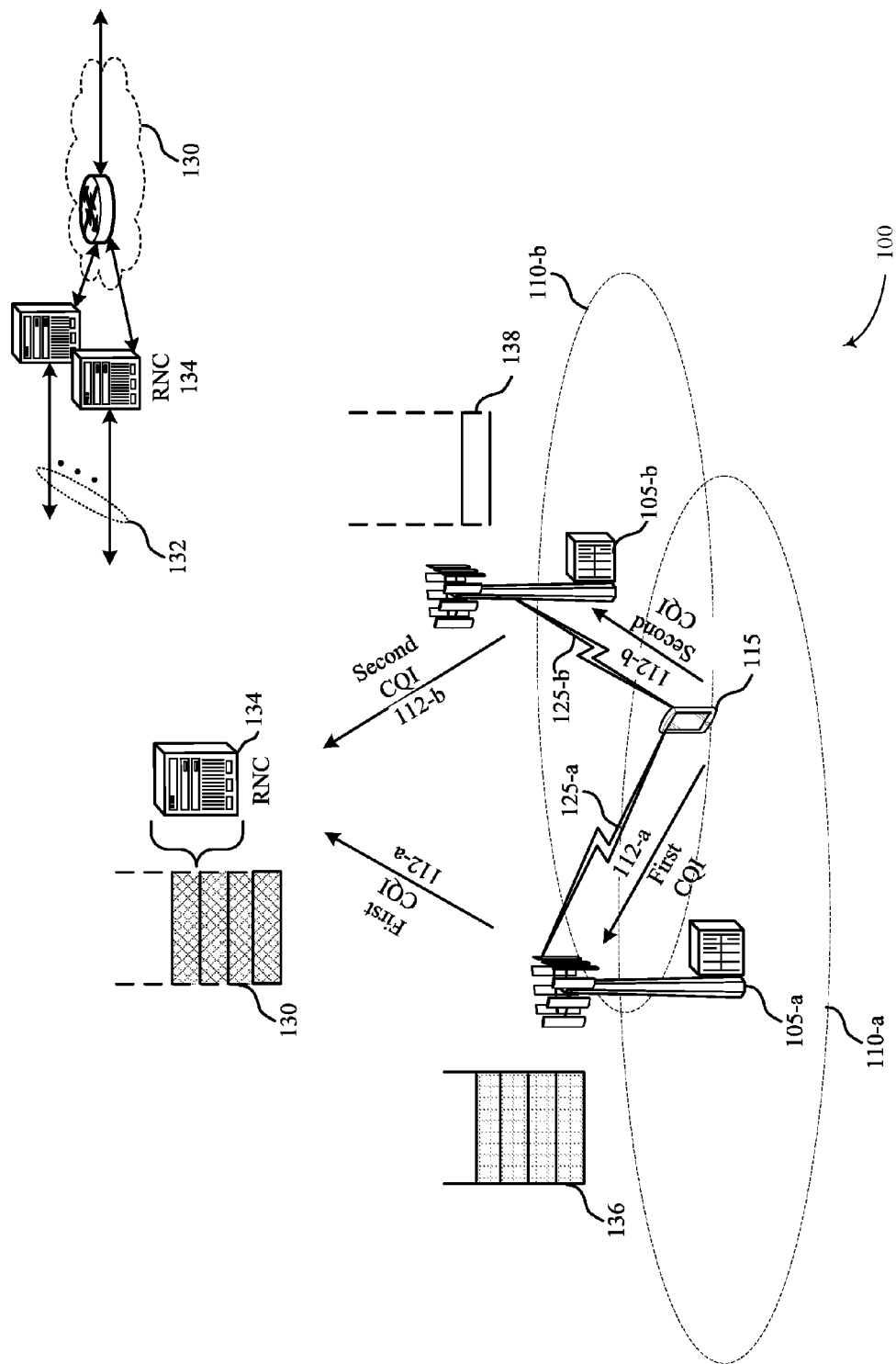
FIG. 1 illustrates an example of a wireless communications system for traffic management in accordance with various aspects of the present disclosure.

As discussed above, in conventional cellular networks, the network lacks sufficient information to make an informed decision on whether or not to offload the UE to a less congested cell, and more importantly, accurately identifying which UEs to offload, if any. In particular, current cellular networks lack the ability to identify the UE capabilities (e.g., whether the UE is equipped with interference cancellation capability) and anticipate expected UE performance if the UE is in fact offloaded to the less congested neighboring cell.

For example, in some instances, although the neighboring cell may be less congested than the serving cell, the offloaded UE may experience higher interference or weaker signal at the neighboring cell. In some cases, this may be due to the inability of the offloaded UE to cancel or suppress interference, which may be stronger in the neighboring cell as compared to what the UE would have experienced had the UE stayed at the serving cell. Accordingly, it may be counter intuitive, in some situations, for the network to make decisions on offloading without a complete understanding of the network radio conditions and/or UE capabilities and/or performance.

Aspects of the present disclosure provide real-time assessments to a network by leveraging measurement reports from UE. In some aspects, the network utilizes the CQI information received from each of the serving cell and the neighboring cell to identify UE capabilities and expected UE performance prior to either offloading or rerouting traffic to the UE. In some examples, the network (e.g., RNC) may receive CQI information associated with both the serving cell and the neighboring cell (or "candidate offloading cell") from a single base station. For example, RNC may receive CQI information associated with the neighboring cell via the serving cell base station. Alternatively, the RNC may receive CQI information associated with the serving cell via the neighboring cell base station.

In one or more examples, the RNC may receive the CQI information associated with the serving cell and/or the neighboring cell based on configuration parameters identified by the RNC. For instance, the RNC may dictate how frequency (e.g., periodically or based on satisfaction of a threshold) the cells report CQI information. Additionally or alternatively, the RNC may identify whether the serving cell or neighboring cell may filter the CQI report and identify the level of granularity applied to the CQI report. Accordingly, in some aspects, the RNC may utilize the CQI information from each of the serving cell and the neighboring cell(s) to identify load distribution, signal strength, anticipated data rate, and/or UE capabilities at each of the cell(s) (e.g., serving and neighboring cell).

Thus, based on the received CQI information and a greater understanding (relative to current cellular networks) of the anticipated UE performance, the RNC may be better equipped to determine whether to offload and/or reroute traffic (e.g., data packets stored and/or received at the RNC destined for the UE) scheduled for transmission to the UE from the serving cell to the neighboring cell. Additionally or alternatively, the RNC, in some situations, may identify one or more UEs served by the serving cell that are candidates for offloading to a neighbor cell (which may be selected from one or more neighbor cells) based on determining the traffic load distribution between the serving cell and the neighbor cell (or one or more neighboring cells).

FIG. 1 illustrates an example of a wireless communications system 100 for traffic management in accordance with various aspects of the present disclosure. The system 100 includes base stations 105 (also referred to as cells; in some aspects, a base station may operate one or more cells), mobile devices 115, and a core network 130. In some aspects of the present disclosure, the base station 105 may be referred to as, but is not limited to, a macro cell base station. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). In one or more examples, the one or more base stations 105 may be controlled by the RNC 134. In some aspects, the RNC 134 may be responsible for managing traffic distribution between a plurality of base stations 105. The base stations 105 may perform radio configuration and scheduling for communication with the mobile devices 115. In various examples, the base station 105 may communicate, either directly or indirectly (e.g., through core network 130), with each other over backhaul links 134 (e.g., X2, Over-the-air (OTA) etc.), which may be wired or wireless communication links. In some aspects of the present disclosure, the base stations 105 may share their respective timing parameters associated with communication scheduling.

The base station 105 may wirelessly communicate with the mobile device 115 via one or more antennas. The base station 105 may provide communication coverage for a respective geographic coverage area 110. In some examples, base station 105 may be referred to as a base transceiver station, a radio base station, an access point, a radio transceiver, a NodeB, eNodeB (eNB), Home NodeB, a Home eNodeB, or some other suitable terminology. The geographic coverage area 110-a for a first base station 105-a and coverage area 110-b for second base station 105-b may be divided into sectors making up only a portion of the coverage area (not shown). The wireless communications system 100 may include base stations 105 of different types (e.g., macro or small cell base stations). There may be overlapping geographic coverage areas 110 for different technologies.

While the mobile devices 115 may communicate with each other through the base station 105 using communication links 125, each mobile device 115 may also communicate directly with one or more other mobile devices 115 via a direct wireless link. Two or more mobile devices 115 may communicate via a direct wireless link when both mobile devices 115 are in the geographic coverage area 110. Examples of direct wireless link may include Wi-Fi Direct connections, connections established using a Wi-Fi Tunneled Direct Link Setup (TDLS) link, and other P2P group connections. In other implementations, other peer-to-peer connections or ad hoc networks may be implemented within the system 100.

In some examples, the wireless communications system 100 includes a wireless wide area network (WWAN) such as an LTE/LTE-Advanced (LTE-A) network. In LTE/LTE-A networks, the term evolved node B (eNB) may be generally used to describe the base stations 105, while the term user equipment (UEs) may be generally used to describe the mobile devices 115. The wireless communications system 100 may include a heterogeneous LTE/LTE-A network in which different types of eNBs provide coverage for various geographical regions. The wireless communications system 100 may, in some examples, also support a wireless local area network (WLAN). A WLAN may be a network employing techniques based on the Institute of Electrical and Electronics Engineers (IEEE) 802.11x family of standards ("Wi-Fi"). In some examples, each eNB or base station 105 and AP 120 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell base station or macro cell generally covers a relatively large geographic area (e.g., several kilometers in radius) and may allow unrestricted access by mobile device 115 with service subscriptions with the network provider. A small cell base station or small cell is a lower-powered base station or cell, as compared with a macro cell base station or macro cell, that may operate in the same or different (e.g., licensed, unlicensed, etc.) frequency bands as macro cell base stations or macro cells. Small cells may include pico cells, femto cells, and micro cells according to various examples. A pico cell, for example, may cover a small geographic area and may allow unrestricted access by mobile device 115 with service subscriptions with the network provider. A femto cell may also cover a small geographic area (e.g., a home) and may provide restricted access by mobile device 115 having an association with the femto cell (e.g., mobile device 115 in a closed subscriber group (CSG), mobile device 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). In some aspects of the present disclosure, the base station 105 may be referred to as a macro cell base station, and AP 120 may be referred to as small cell base station.

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a mobile device 115 and the base stations 105. The RRC protocol layer may also be used for core network 130 support of radio bearers for the user plane data. At the physical (PHY) layer, the transport channels may be mapped to physical channels.

The mobile devices 115 may be dispersed throughout the wireless communications system 100, and each mobile device 115 may be stationary or mobile. A mobile device 115 may also include or be referred to by those skilled in the art as a user equipment (UE), mobile station, a subscriber station, STA, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wireless local loop (WLL) station, or the like. A mobile device may be able to communicate with various types of base stations and network equipment including macro eNBs, small cell eNBs, relay base stations, and the like. In some examples, a dual-radio UE 115, may include a WLAN radio (not shown) and a WWAN radio (not shown) that may be configured to concurrently communicate with base station 105 (using the WWAN radio) and with access point (AP—not shown) (using the WLAN radio).

The communication links 125 shown in wireless communications system 100 may include uplink (UL) transmissions from a mobile device 115 to a base station 105, or downlink (DL) transmissions, from a base station 105 to a mobile device 115. The downlink transmissions may also be called forward link transmissions while the uplink transmissions may also be called reverse link transmissions. Each communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The communication links 125 may utilize resources of licensed spectrum or unlicensed spectrum, or both. Broadly speaking, the unlicensed spectrum in some jurisdictions may range from 600 Megahertz (MHz) to 6 Gigahertz (GHz), but need not be limited to that range. As used herein, the term "unlicensed spectrum" or "shared spectrum" may thus refer to industrial, scientific and medical (ISM) radio bands, irrespective of the frequency of those bands. An "unlicensed spectrum" or "shared spectrum" may refer to a spectrum used in a contention-based communications system. In some examples, unlicensed spectrum is the U-NII radio band, which may also be referred to as the 5 GHz or 5G band. In some aspects, the "unlicensed spectrum" may include spectrum that may be reserved for mission critical devices (e.g., radar and non-civilian systems).

Wireless communications system 100 may also support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A mobile device 115 may be configured with multiple downlink CCs and one or more uplink CCs for carrier aggregation. Carrier aggregation may be used with both FDD and TDD component carriers.

In accordance with aspects of the present disclosure, the RNC 134 may be responsible for scheduling traffic to the UE 115 via either the first cell (e.g., first base station 105-a) or the second cell (e.g., second base station 105-b). As such, the RNC 134 may maintain a queue 130 of data packets containing data and/or control signals stored at the RNC (e.g., memory 502 in FIG. 5) of the RNC. As such, in an aspect, data packets stored in queue 130 that are destined for UE 115 may be referred to herein as "traffic" that may be scheduled by RNC 134 to, for example, first cell (e.g., first base station 105-a) or second cell (e.g., second base station 105-b) for delivery to UE 115. In some aspects, one or more cells may also maintain respective queues (e.g., first cell queue 136 and second cell queue 138) containing traffic scheduled for downlink transmission to the UE 115. In one or more examples, the RNC 134 may identify the traffic load at each cell based on the amount of data stored at each queue pending transmission to the UE 115.

Additionally or alternatively, the RNC 134, in accordance with various aspects of the present disclosure may be configured to receive a first CQI 112-a information associated with a first cell 105-a having a first high speed downlink channel with the UE 115, and receive a second CQI 112-b information associated with a second cell 105-b having a second high speed downlink channel with the UE 115. In some aspects, the RNC 134 may determine whether to reroute the traffic 130 scheduled for transmission to the UE 115 via the second cell 105-b based on receiving the first CQI 112-a and the second CQI 112-b.

In some aspects, the RNC 134 may determine whether to reroute the data scheduled for transmission via the second cell based on receiving the first CQI and the second CQI by mapping a first data rate supported by the first cell 105-a based on the first CQI and mapping a second data rate supported by the second cell 105-b based on the second CQI. Accordingly, in some examples, the RNC 134 may be configured to determine whether the second data rate supported by the second cell exceeds the first data rate supported by the first cell. If, the RNC 134 determines that the second data rate supported by the second cell exceeds (e.g., has a greater value than) the first data rate supported by the first cell 510, the RNC 134 may recommend rerouting the traffic from the first cell to the second cell. Alternatively, if, the RNC 134 determines that the second data rate supported by the second cell falls below (e.g., has a same or lesser value than) the first data rate supported by the first cell 105-b, the RNC 134 may recommend against rerouting the traffic from the first cell 105-a to the second cell 105-b.

Additionally or alternatively, the RNC 134 may be configured to determine whether to reroute the data scheduled for transmission via the second cell 105-b based on determining a traffic load distribution between the first cell 105-a and the second cell 105-b, where respective cell load information may be included in the respective first CQI 112-a and second CQI 112-b.

In yet further examples, the RNC 134 may identify one or more UEs 115 served by the first cell 105-a that may be candidates for offloading to the second cell 105-b. For example, the RNC 134 may identify which of the plurality of UEs 115 may have interference cancellation or suppression capability, and/or an amount of such capability, which may be inherent in the respective values of the first CQI 112-*a* and second CQI 112-*b* (since the reported CQIs are post-interference measurement values). Accordingly, the RNC 134 may identify the UEs 115 with a sufficient and/or relatively better interference cancellation or suppression capability to be candidates for offloading to the second cell 105-*b*. In some examples, the term "offloading" may be used to describe rerouting the scheduled traffic, and/or assigning the UE 115, to a new serving cell (e.g., changing the serving cell associated with the UE 115).

Figure 2:
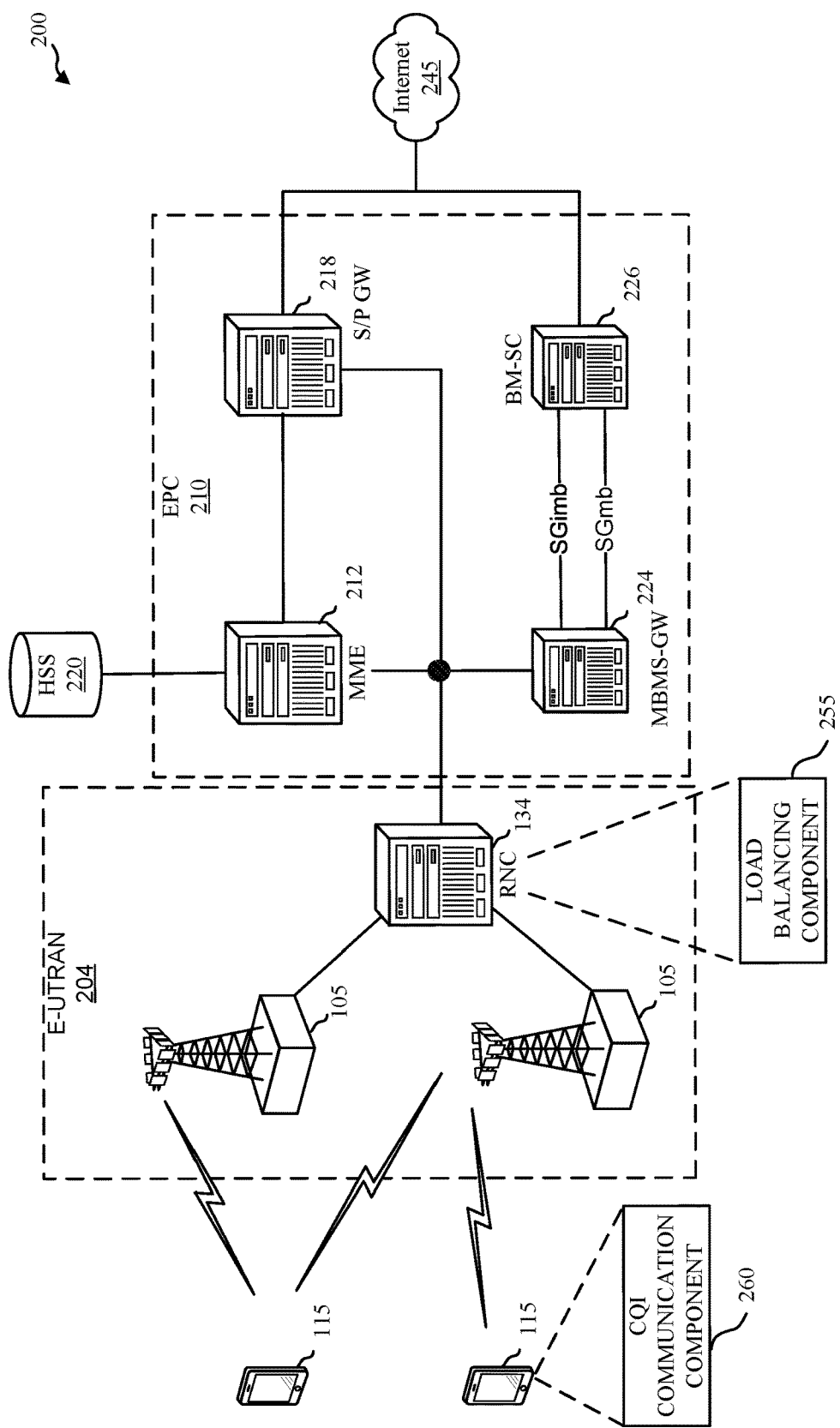
FIG. 2 illustrates another example of a wireless communications system in accordance with various aspects of the present disclosure.
Figure 4:
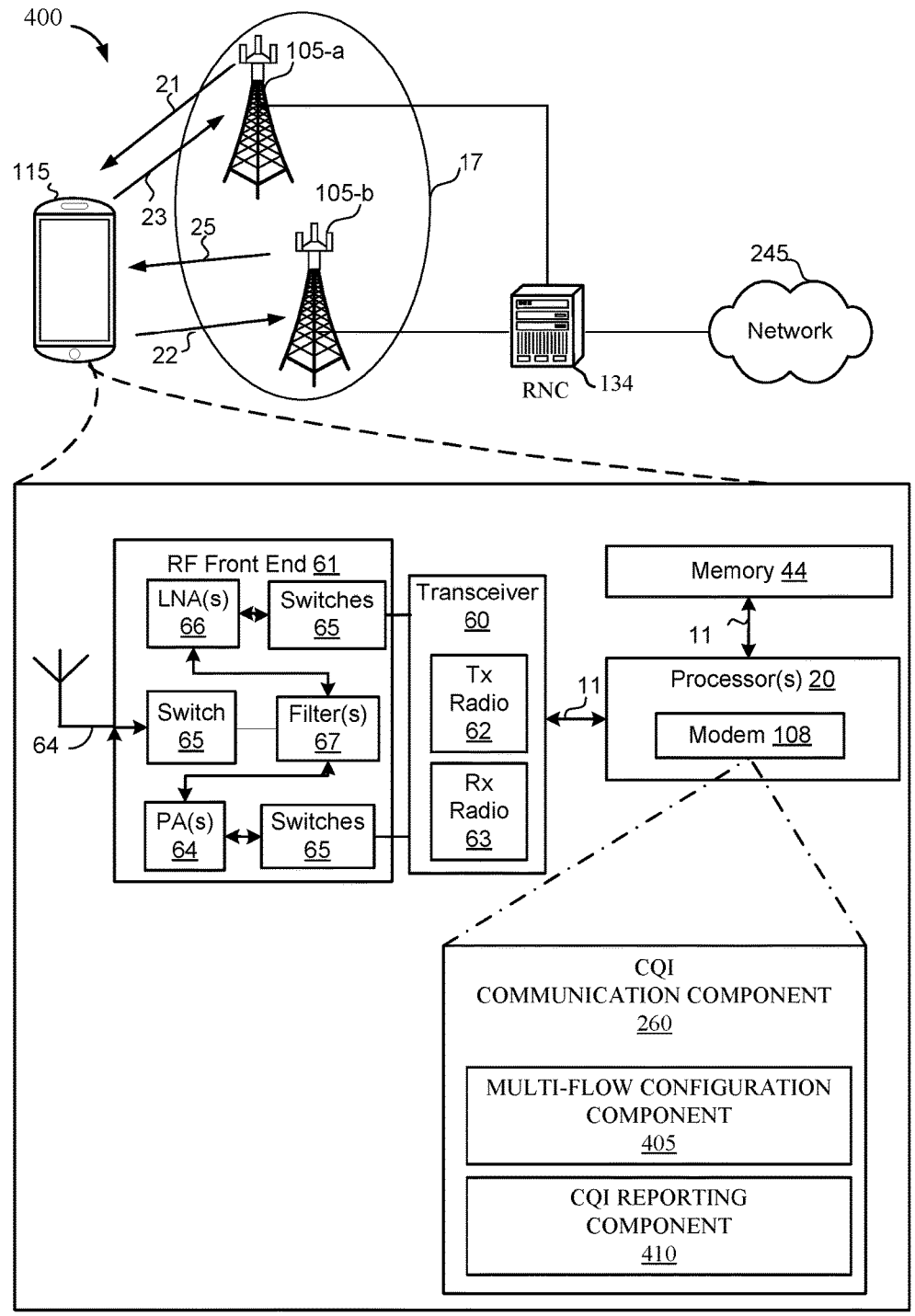
FIG. 4 is a schematic diagram of a device including an aspect of a user equipment that may implement various aspects of the present disclosure.

FIG. 2 is a diagram illustrating network architecture 200 in accordance with aspects of the present disclosure, including RNC 134 having a load balancing component 255 to execute one or more functions of the present disclosure (e.g., FIGS. 5-6), and including one or more UEs 115 having CQI communication component 260 to execute one or more functions of the present disclosure (e.g., FIG. 4). The network architecture 200 may be referred to as an Evolved Packet System (EPS) 200 and may be an example of wireless communication system 100 illustrated in FIG. 1. The EPS 200 may include the one or more user UEs 115, an Evolved UMTS Terrestrial Radio Access Network (E-UTRAN) 204, an Evolved Packet Core (EPC) 210, and an Operator's Internet Protocol (IP) Services (e.g., group communication system application server (GCS-AS) 245. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 105 and other eNBs 105, and may include a Multicast Coordination Entity (MCE). The eNB 105 provides user and control planes protocol terminations toward the UE 115. The eNB 105 may be connected to the other eNBs 105 via a backhaul (e.g., an X2 interface). The MCE allocates time/frequency radio resources for evolved Multimedia Broadcast Multicast Service (MBMS) (eMBMS), and determines the radio configuration (e.g., a modulation and coding scheme (MCS)) for the eMBMS. The MCE may be a separate entity or part of the eNB 105. The eNB 105 may also be referred to as a base station, a Node B, an access point, a base transceiver station, a radio base station, a radio transceiver, a transceiver function, a basic service set (BSS), an extended service set (ESS), or some other suitable terminology. The eNB 105 provides an access point to the EPC 210 for a UE 115. In some aspects, as noted above, one or more of the UEs 115 may include CQI communication component 260 to execute one or more functions of the present disclosure (e.g., FIG. 4).

The eNB 105 is connected to the EPC 210 via the radio network controller 134. The RNC 134 may be a governing element in the UMTS radio access network (UTRAN) and may be responsible for controlling the base stations 105 that may be connected to it. The RNC 134 may carry out radio resource management, the mobility management functions, and perform encryption on data before user data is sent to and from the UE. The RNC 134 may be connects to the Circuit Switched Core Network through Media Gateway (MGW), Serving/Packet Data Network (PDN) Gateway 218 and or Mobility Management Entity (MME) 212. In some examples, as noted above, the RNC 134 may include may include load balancing component 255 to execute one or more functions of the present disclosure (e.g., FIGS. 5-6).

The EPC 210 may be part of the core network 130 (see FIG. 1) and may include a MME 212, a Home Subscriber Server (HSS) 220, a Multimedia Broadcast Multicast Service (MBMS) Gateway 224, a Broadcast Multicast Service Center (BM-SC) 226, and a S/P Gateway 218. The MME 212 is the control node that processes the signaling between the UE 115 and the EPC 210. Generally, the MME 212 provides bearer and connection management. All user IP packets are transferred through the S/P Gateway 218. The S/P Gateway 218 provides UE IP address allocation as well as other functions. The BM-SC 126 is connected to the IP Services 245 that may include one or more application servers. In some examples, an IP service may be operated and/or managed by a $3^{rd}$ party. Additionally or alternatively, the internet services 245, in some examples, may be operated by the network operator (e.g., operator of core network 130).

In some examples, the IP Services may include the Internet, an intranet, an IP Multimedia Subsystem (IMS), a PS Streaming Service (PSS), and/or other IP services. In some aspects, the BM-SC 226 may provide functions for MBMS user service provisioning and delivery. The BM-SC 226 may serve as an entry point for content provider MBMS transmission, may be used to authorize and initiate MBMS Bearer Services within a PLMN, and may be used to schedule and deliver MBMS transmissions. The MBMS Gateway 224 may be used to distribute MBMS traffic to the eNBs 105 belonging to a Multicast Broadcast Single Frequency Network (MBSFN) area broadcasting a particular service, and may be responsible for session management (start/stop) and for collecting eMBMS related charging information.

Figure 3:
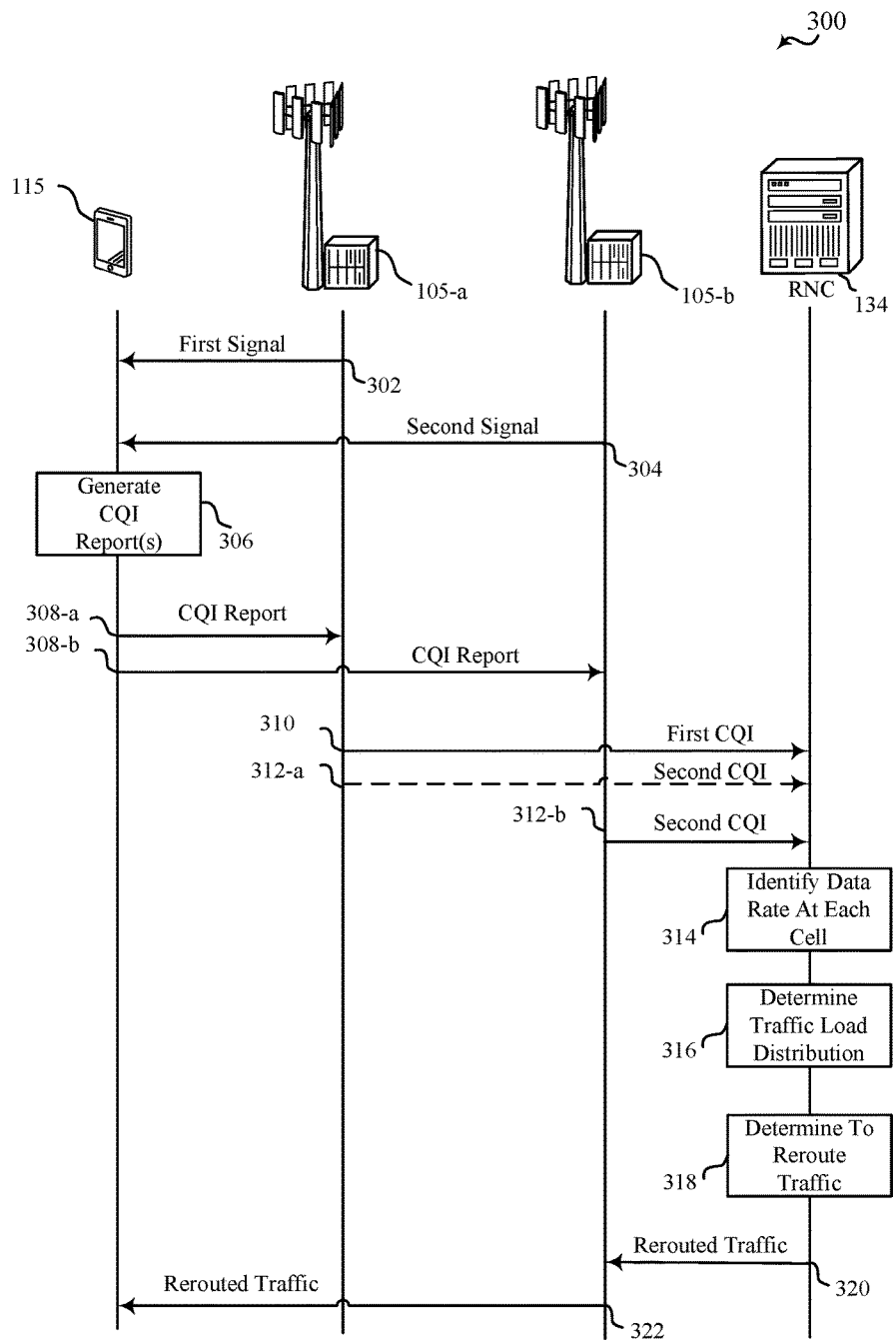
FIG. 3 illustrates a call flow diagram for traffic management in accordance with various aspects of the present disclosure.

FIG. 3 illustrates a call flow diagram 300 for traffic management in accordance with various aspects of the present disclosure. The call flow diagram 300 may include one or more UEs 115 in communication with one or more base stations 105 representing one or more cells. For example, the first base station 105-*a* may be associated with a first cell (e.g., serving cell) and the second base station 105-*b* may be associated with a second cell (e.g., neighboring cell). Each of the first base station 105-*a* and the second base station 105-*b* may communicate with the network via the RNC 134. In some aspects, the UEs 115, base stations 105, and the RNC 134 may be an example of each as described with reference to FIGS. 1-2. In the illustrated example, it should be assumed that prior to implementation of the steps described herein, the traffic (e.g., data packets including data and/or control signals) are stored at the RNC 134 and scheduled for transmission to the UE 115 by the RNC 134 via the first cell 105-*a* (serving cell).

Accordingly, in one or more example, the UE 115 may be located within the coverage area of both the first base station 105-*a* and the second base station 105-*b* (e.g., if the UE 115 is at or near the edge of each coverage cell or within an overlapping coverage area). Accordingly, the UE 115 may receive the first signal 302 and the second signal 304. In some aspects, the first signal 302 and the second signal 304, which may include data and/or control signals associated with data packets destined for UE 115, may be transmitted by each base station respectively. At 306, the UE 115 may calculate and generate one or more CQI reports, e.g., including first CQI 112-*a* information and second CQI 112-*b* information, respectively based on observed signal-to-interference-plus-noise ratio (SINR) and received signal strength at the UE 115 for the first signal 302 and the second signal 304 respectively transmitted by the first cell and the second cell. In some aspects, the UE 115 may additionally include UE capability information (e.g., whether UE 115 is equipped with interference cancellation capabilities) in the one or more CQI reports. In some examples, the CQI report may be a joint CQI report (e.g., a combined report that may be decoded by each base station, at least in part, e.g., where each base station may decode information associated with the signal it transmitted) or a separate first and second CQI report associated with each of the first and second base stations 105 respectively.

At 308, the UE 115 may transmit the respective CQI report to each of the first base station 105-a and the second base station 105-b. Accordingly, the first base station 105-a, at 310, upon decoding the CQI report from the UE 115 may transmit the first CQI associated with a first high speed downlink channel (e.g., over which the first signal 302 is received) to the RNC 134. In one aspects, at 312-a, the first base station 105-a (e.g., serving cell base station) may also transmit the second CQI to the RNC 134, where the second CQI is associated with the second base station 105-b. In such instance, the first base station 105-a may be configured to transmit CQI information of a different base station 105-b to the RNC 134. Additionally or alternatively, at 312-b, the second base station 105-b may also decode the CQI report from the UE 115 and transmit the second CQI associated with a second high speed downlink channel (e.g., over which the second signal 304 is received) to the RNC 134. As such, in some examples, the second CQI may be independent of the first CQI in that each CQI may be separately received at RNC 134 from a respective base station. Alternatively, in other examples, the first CQI and the second CQI may be transmitted from a single cell (e.g., serving cell base station) to the RNC. In such instance, the base station(s) may be configured to transmit CQIs associated with different cells or eNodeBs to the RNC.

The RNC 134, at 314, upon receiving the first CQI and the second CQI may identify the data rate at each cell. In some examples, identifying the data rate of the first cell and the second cell may include mapping the first CQI to the first data rate associated with the first cell and mapping the second CQI to the second data rate associated with the second cell. Additionally or alternatively, the RNC 134, at 316, may also determine the traffic load distribution between the first cell and the second cell based on the received first and second CQI. In some aspects, determining the traffic load distribution may include determining the number of UEs currently served by each of the first cell and the second cell. Additionally, the RNC, while considering the traffic load distribution may also factor in bandwidth utilization/ requirements of the plurality of UEs 115 on each of the cells. For example, although the neighboring base station may serve significantly less UEs than the current serving cell (e.g., 100 UEs on the neighboring cell compared to 500 UEs on the serving cell), the 100 UEs being served by the neighboring cell may have significantly higher bandwidth requirements (e.g., large number of UEs may be streaming, for example, a live sporting event) compared to the 500 UEs on the serving cell (e.g., most of the UEs are periodically using the device for, for example, voice or brief web browsing). Therefore, in such instances, the RNC 134 may consider not only the number of UEs being served by each cell, but also the overall bandwidth requirements at each cell to better gauge the anticipated UE 115 performance.

At 318, the RNC 134, may determine whether to reroute at least portion of the traffic scheduled for transmission to the UE 115 from the first cell 105-a to the second cell 105-b. In some examples, rerouting of at least the portion of the traffic comprises rerouting an entirety of the traffic scheduled for transmission to the UE 115 from the first cell 105-a to the second cell 105-b. Based on the determining, the RNC 134, at 320, may transmit from the second cell 105-b to the UE 115, at least the portion of the traffic. For example, the RNC 134 may transmit the queued traffic packets at the RNC 134 that were originally scheduled to be transmitted via the first cell 105-a to be routed, at 322, to the UE 115 via the second cell 105-b.

Referring to FIG. 4, in an aspect, a wireless communication system 400 includes at least one UEs 115 in communication coverage of at least one base station 105. UE 115 can communicate with a network 245 via a RNC 135. In an aspect, the UE 115, the base station 105, the RNC 134 and the network 245 may be examples of each described with reference to FIGS. 1-3. In some aspects, multiple UEs including UE 115 may be in communication coverage with one or more network entities, including base station 105. In an example, UE 115 may transmit and/or receive wireless communications to and/or from the base station 105. For example, the UE 115 may transmit a first CQI 23 to the first base station 105-a, and transmit a second CQI 22 to the second base station 105-b. As discussed below, the first CQI 23 and the second CQI 22 may be either a joint CQIs (e.g., single CQI report for a plurality of base stations 105 that is decoded at the base station 105) or an individual CQIs (e.g., first CQI information associated with the first base station 105-a and second CQI information associated with the second base station 105-b).

In an aspect, the UE 115 may include one or more processors 20 that may operate in combination with CQI communication component 260 operable to generate and report CQI report(s) to the one or more base stations 105, which may further transmit the respective CQI report(s) to the RNC 134. The one or more processors 20 may include a modem 108 that uses one or more modem processors. The various functions related to CQI communication component 260 may be included in modem and/or processors 20 and, in an aspect, can be executed by a single processor, while in other aspects, different ones of the functions may be executed by a combination of two or more different processors. For example, in an aspect, the one or more processors 20 may include any one or any combination of a modem processor, or a baseband processor, or a digital signal processor, or a transmit processor, or a transceiver processor associated with transceiver 60, or a system on chip (SoC). In particular, the one or more processors 20 may execute functions and components included in CQI communication component 260.

In some aspects, the modem 107 may operate in combination with CQI communication component 260 operable to generate and report CQI report(s) to the one or more base stations 105, which may further transmit the respective CQI report(s) to the RNC 134. In one or more aspects, the CQI communication component 260 may include a multi-flow configuration component 405 and a CQI reporting component 410.

In some examples, the multi-flow configuration component 405 may be configured by the network (e.g., RNC 134) to operate in at least one of a multi-flow mode or a simplified mode. In the multi-flow mode, the UE 115 may monitor and decode signals from the plurality of base stations 105 (e.g., when the UE 115 is at or near the edge of two cells as illustrated in FIG. 1 and receiving signals from both base stations 105). Additionally, the UE 115, in the multi-flow mode, may generate a joint CQI report that identifies observed channel quality from the plurality of signals received from the plurality of base stations 105. Alternatively, the UE 115, in a simplified mode, may be configured to observe only the signals received from the serving cell, while ignoring signals from the neighboring base station (e.g., decode signals from serving cell and drop the packets received from the neighboring cell). Additionally, the UE 115, in the simplified mode, may be configured to send individual CQI reports to each of the base stations. Accordingly, in some aspects, the RNC 134 may transmit a configuration instruction to the UE 115 where the configuration instructions instructs the UE 115 to send both the first CQI and the second CQI and to only decode the first cell (e.g., serving cell).

Additionally or alternatively, the CQI reporting component 410 may be configured to generate and send information to the base stations 105 indicating suitable downlink transmission data rate (e.g., a modulation and coding scheme (MCS) value). In one or more examples, the CQI reporting component 410 may generate a 4-bit integer that identifies observed signal-to-noise-plus noise ratio (SINR) at the UE 115. In some aspects, the CQI estimation process may take into account the UE capability such as the number of antennas, the type of receiver used for detection, and/or the UE interference cancellation capabilities. Identifying the UE capability may be important because for the same SINR value, the MCS level that can be supported by the UE 115 may depend on the various UE capabilities, which may need to be taken into account in order for the eNode-B to select an optimum MCS level for the transmission. Additionally or alternatively, the RNC 134 may utilize the CQI information received from the UE 115 to determine whether to reroute at least a portion of the data/traffic (e.g., data packets or control packets) scheduled for transmission to the UE 115 from the first cell to the second cell. Accordingly, in some examples, the RNC 134 may reroute traffic scheduled for downlink transmission (e.g., downlink traffic 21 and 25) from the first base station 105-a to the second base station 105-b.

The wireless communications between the UE 115 and the base station 105 may further include signals transmitted by either the base station 105 or the UE 115. The wireless communications can include downlink channels transmitted by the network entity 14. For example, the network entity 14 may transmit a high-speed downlink shared channel (HS-DSCH), high-speed physical downlink shared channel (HS-PDSCH), downlink dedicated physical control channel (DL-DPCCH), or a fractional dedicated physical channel (F-DPCH).

In some examples, the CQI communication component 216 and each of the sub-components may comprise hardware, firmware, and/or software and may be configured to execute code or perform instructions stored in a memory (e.g., a computer-readable storage medium). As discussed above, in some aspects, the CQI communication component 216 may additionally include a multi-flow configuration component 405 and the CQI reporting component 410. The multi-flow configuration component 405 and the CQI reporting component 410 may comprise hardware, firmware, and/or software and may be configured to execute code or perform instructions stored in a memory (e.g., a computer-readable storage medium).

Moreover, in an aspect, UE 115 may include RF front end 61 and transceiver 60 for receiving and transmitting radio transmissions, for example, wireless communications (e.g., communications 21-25) transmitted by base station 105. For example, transceiver 60 may receive a packet transmitted by the base station 105. UE 115, upon receipt of an entire message, may decode the message and perform a cyclic redundancy check (CRC) to determine whether the packet was received correctly. For example, transceiver 60 may communicate with modem 108 to transmit messages generated by CQI communication component 260 and to receive messages and forward them to CQI communication component 260.

RF front end 61 may be connected to one or more antennas 64 and can include one or more switches 65, one or more amplifiers (e.g., power amplifiers (PAs) 64 and/or low-noise amplifiers 66), and one or more filters 67 for transmitting and receiving RF signals on the uplink channels and downlink channels. In an aspect, components of RF front end 61 can connect with transceiver 60. Transceiver 60 may connect to one or more modems 108 and processor 20.

Transceiver 60 may be configured to transmit (e.g., via transmitter radio 62) and receive (e.g., via receiver radio 63) and wireless signals through antenna 64 via RF front end 61. In an aspect, transceiver may be tuned to operate at specified frequencies such that UE 115 can communicate with, for example, network entity 105. In an aspect, for example, modem 108 can configure transceiver 60 to operate at a specified frequency and power level based on the UE configuration of the UE 115 and communication protocol used by modem.

UE 115 may further include a memory 44, such as for storing data used herein and/or local versions of applications or CQI communication component 260 and/or one or more of its subcomponents being executed by processor 20. Memory 44 can include any type of computer-readable medium usable by a computer or processor 20, such as random access memory (RAM), read only memory (ROM), tapes, magnetic discs, optical discs, volatile memory, non-volatile memory, and any combination thereof. In an aspect, for example, memory 44 may be a computer-readable storage medium that stores one or more computer-executable codes defining CQI communication component 260 and/or one or more of its subcomponents, and/or data associated therewith, when UE 115 is operating processor 20 to execute load balancing component 255 and/or one or more of its subcomponents. Additionally or alternatively, the UE 115 may include a bus 11 for coupling the RF front end 61, transceiver 60, memory 44 and processor 20 and to exchange signaling information between each of the components and/or subcomponents of the UE 115.

Figure 5:
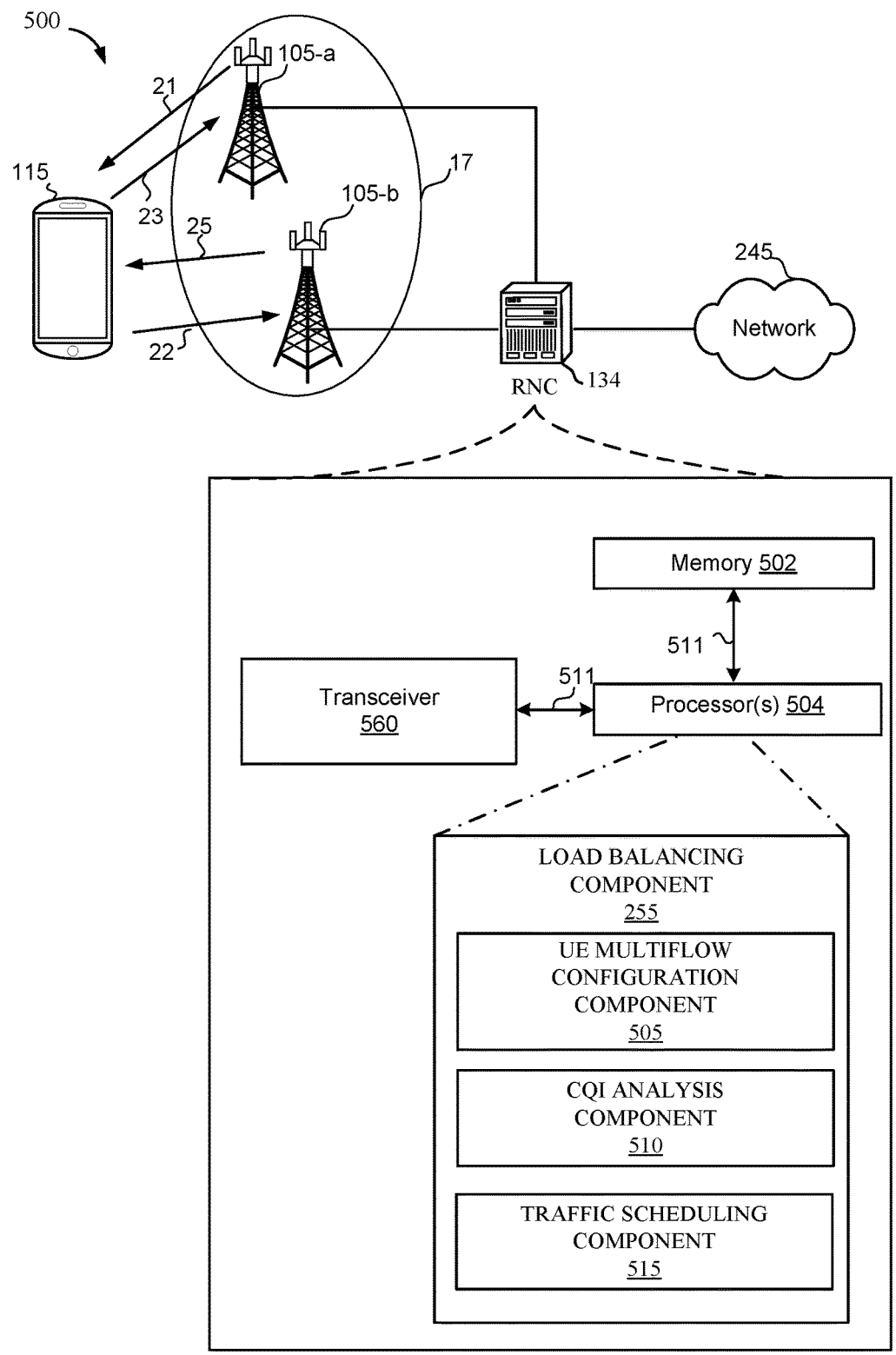
FIG. 5 is a schematic diagram of a device including an aspect of the RNC that may implement various aspects of the present disclosure.

FIG. 5, in an aspect, illustrates a wireless communication system 500 similar to architecture described with reference to FIG. 4. In particular, the wireless communication system 500 illustrates a schematic diagram of a RNC 134 and its subcomponents in accordance with various aspects of the present disclosure. The wireless communication system 500 may also include at least one user equipment (UE) 115 in communication coverage of at least one base station 105. UE 115 can communicate with a network 245 via a radio network control (RNC) 135. In an aspect, the UE 115, the base station 105, the RNC 134 and the network 245 may be examples of each described with reference to FIGS. 1-4.

As discussed above, multiple UEs including UE 115 may be in communication coverage with one or more network entities, including base station 105. In an example, UE 115 may transmit and/or receive wireless communications to and/or from the base station 105. For example, the UE 115 may transmit a first CQI 23 to the first base station 105-a, and transmit a second CQI 22 to the second base station 105-b.

In one or more examples, the RNC 134 may include a memory 502, such as for storing data used herein and/or local versions of applications or load balancing component 255 and/or one or more of its subcomponents being executed by processor 504. Memory 502 can include any type of computer-readable medium usable by a computer or processor 504, such as random access memory (RAM), read only memory (ROM), tapes, magnetic discs, optical discs, volatile memory, non-volatile memory, and any combination thereof. In an aspect, for example, memory 502 may be a computer-readable storage medium that stores one or more computer-executable codes defining load balancing component 255 and/or one or more of its subcomponents, and/or data associated therewith, when RNC 134 is operating processor 504 to execute load balancing component 255 and/or one or more of its subcomponents. Additionally or alternatively, the RNC may include a bus 511 for coupling the transceiver 560, memory 502 and processor 504 and to exchange signaling information between each of the components and/or subcomponents of the RNC 134.

In an aspect, the RNC 134 may include one or more processors 504 that may operate in combination with load balancing component 255 operable to determine whether to reroute at least a portion of the traffic/data scheduled for downlink transmission from a first cell to a second cell based on received CQI information. The various functions related to load balancing component 255 may be included in the processors 504 and, in an aspect, can be executed by a single processor, while in other aspects, different ones of the functions may be executed by a combination of two or more different processors. For example, in an aspect, the one or more processors 504 may include any one or any combination of a modem processor, or a baseband processor, or a digital signal processor, or a transmit processor, or a transceiver processor associated with transceiver 60, or a system on chip (SoC). In particular, the one or more processors 504 may execute functions and components included in load balancing component 255.

In some aspects, the RNC 134 utilizing the UE multi-flow configuration component 505 may transmit a configuration instruction to the UE 115 where the configuration instructions instructs the UE 115 to send both the first CQI and the second CQI and to only decode the first cell (e.g., serving cell). Additionally or alternatively, the load balancing component 255 may include a CQI analysis component 510 for determining, at the RNC 134, whether to reroute traffic (e.g., data packets and control signal packets) scheduled for transmission to the UE 115 via the second cell based on receiving the first CQI and the second CQI from the UE 115 (forwarded by the base stations 105). In some aspects, determining whether to reroute the data scheduled for transmission via the second cell based on receiving the first CQI and the second CQI may comprise the CQI analysis component 510 to determine a first data rate supported by the first cell based on receiving the first CQI and determine a second data rate supported by the second cell based on receiving the second CQI. Accordingly, in some examples, the CQI analysis component 510 may be configured to determine whether the second data rate supported by the second cell exceeds the first data rate supported by the first cell. If, the CQI analysis component determines that the second data rate supported by the second cell exceeds the first data rate supported by the first cell 510, the RNC 134 may recommend rerouting the traffic from the first cell to the second cell.

Additionally or alternatively, determining whether to reroute the data scheduled for transmission via the second cell based on receiving the first CQI and the second CQI may comprise the CQI analysis component 510 to determine a traffic load distribution between the first cell and the second cell. Based on the traffic load distribution, the CQI analysis component 510 may identify one or more UEs served by the first cell that are candidates for offloading to the second cell. For example, the CQI analysis component 510 may identify which of the plurality of UEs 115 may have interference cancellation capability. Accordingly, the CQI analysis component 510 may identify the UEs 115 with interference cancellation capability to be candidates for offloading to the second cell. In some examples, the term "offloading" may be used to describe rerouting the scheduled traffic and/or assigning the UE 115 to a new serving cell (e.g., changing the serving cell associated with the UE 115).

The load balancing component 255 may further include a traffic scheduling component 515 for scheduling downlink traffic (e.g., data packets and control signal packets) on either a first cell (e.g., served by first base station 105-*a*) and/or a second cell (e.g., served by second base station 105-*b*). In one or more examples, the load balancing component 255 may utilize the information from CQI analysis component 510 to reroute traffic from the first cell to the second cell.

In some examples, the load balancing component 255 and each of the sub-components may comprise hardware, firmware, and/or software and may be configured to execute code or perform instructions stored in a memory (e.g., a computer-readable storage medium). As discussed above, in some aspects, the load balancing component 255 may additionally include a UE multi-flow configuration component 505, CQI analysis component 510 and the traffic scheduling component 515. The UE multi-flow configuration component 505, CQI analysis component 510 and the traffic scheduling component 515 may comprise hardware, firmware, and/or software and may be configured to execute code or perform instructions stored in a memory (e.g., a computer-readable storage medium).

In some examples the RNC 134 may further include a transceiver 560 configured to transmit and receive wireless signals. In some examples, the transceiver 560 may establish communication with the base stations 105 via wired or wireless communication.

Figure 6:
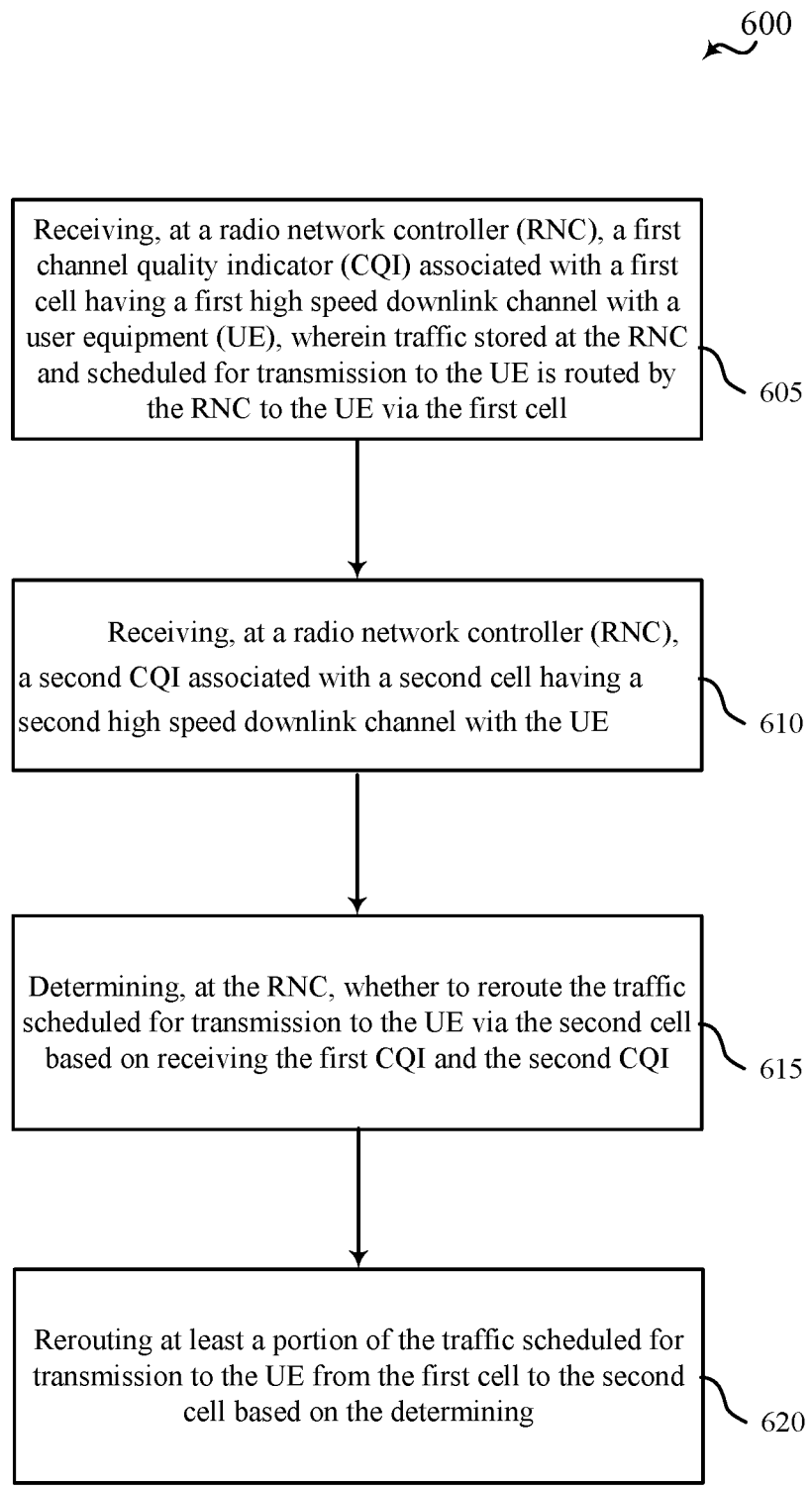
FIG. 6 illustrates an example of a flowchart that shows aspects for traffic management implemented in the UE in accordance with various aspects of the present disclosure.

FIG. 6 is a flowchart conceptually illustrating an example of a method 600 of wireless communication, in accordance with aspects of the present disclosure. For clarity, the method 600 is described below with reference to the RNC 135 described with reference to FIGS. 1-5.

At block 605, the method 600 may include receiving, at a RNC, a first CQI associated with a first cell having a first high speed downlink channel with a UE. In some aspects, the traffic stored at the RNC and scheduled for transmission to the UE is routed by the RNC to the UE via the first cell. In some examples, the term "traffic" may refer to the data packets and/or control signaling packets. Aspects of block 605 may be performed by the transceiver 560 described with reference to FIG. 5, and/or as discussed with reference to FIG. 3 or elsewhere above.

At block 610, the method 600 may include receiving, at the RNC, a second CQI associated with a second cell having a second high speed downlink channel with the UE. Aspects of block 610 may be performed by the transceiver 560 described with reference to FIG. 5, and/or as discussed with reference to FIG. 3 or elsewhere above.

At block 615, the method 600 may include determining, at the RNC, whether to reroute the traffic scheduled for transmission to the UE via the second cell based on receiving the first CQI and the second CQI. Aspects of block 615 may be performed by the CQI analysis component 510 described with reference to FIG. 5, and/or as discussed with reference to FIG. 3 or elsewhere above.

At block 620, the method 600 may include rerouting at least a portion of the traffic scheduled for transmission to the UE from the first cell to the second cell based on the determining. Aspects of block 620 may be performed by the traffic scheduling component 515 described with reference to FIG. 5, and/or as discussed with reference to FIG. 3 or elsewhere above.

The apparatus and methods have been described in the detailed description and illustrated in the accompanying drawings by various elements comprising blocks, modules, components, circuits, steps, processes, algorithms, and the like. These elements, or any portion thereof, either alone or in combinations with other elements and/or functions, may be implemented using electronic hardware, computer software, or any combination thereof. Whether such elements are implemented as hardware or software depends upon the particular application and design constraints imposed on the overall system. In an aspect, the term "component" as used herein may be one of the parts that make up a system and may be divided into other components.

By way of example, an element, or any portion of an element, or any combination of elements may be implemented with a "processing system" that includes one or more processors. A processor may include a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on transitory or non-transitory computer-readable medium. A non-transitory computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), static RAM (SRAM), dynamic RAM (DRAM), synchronous dynamic RAM (SDRAM); double date rate RAM (DDRAM), read only memory (ROM), programmable ROM (PROM), erasable PROM (EPROM), electrically erasable PROM (EEPROM), a general register, or any other suitable non-transitory medium for storing software.

The various interconnections within a processing system may be shown as buses or as single signal lines. Each of the buses may alternatively be a single signal line, and each of the single signal lines may alternatively be buses, and a single line or bus might represent any one or more of a myriad of physical or logical mechanisms for communication between elements. Any of the signals provided over various buses described herein may be time-multiplexed with other signals and provided over one or more common buses.

The various aspects of this disclosure are provided to enable one of ordinary skill in the art to practice the present invention. Various modifications to examples of implementations presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the examples of implementations described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

What is claimed is:

1. A method for traffic management in a wireless communications system, comprising:

initiating, at a radio network controller (RNC), a transmission of a configuration that instructs a user equipment (UE) to transmit a first channel quality indicator (CQI) associated with a first cell having a first high speed downlink channel with the UE and a second CQI associated with a second cell having a second high speed downlink channel with the UE, and to decode traffic from one of the first cell and the second cell;

wherein the traffic is stored at the RNC and scheduled for transmission to the UE, and a portion of the traffic scheduled for transmission is routed by the RNC to the UE via the first cell; and wherein the first CQI and the second CQI are included in one or more CQI reports that are transmitted to each of the first cell and the second cell and wherein the first cell and the second cell filters the one or more CQI reports according to parameters and level of granularity identified by the RNC;

receiving, at the RNC, the first CQI and the second CQI with at least one of the first CQI and the second CQI including whether the UE is equipped with interference cancellation and suppression capabilities according to the parameters and the level of granularity identified by the RNC;

determining, at the RNC, whether to reroute the traffic scheduled for transmission to the UE via the second cell based on receiving the first CQI and the second CQI and whether the UE is equipped with interference cancellation and suppression capabilities; and rerouting a remaining portion of the traffic scheduled for transmission to the UE from the first cell to the second cell based on the determining, wherein said portion comprises queued traffic packets at the RNC.

2. The method of claim 1, wherein the determining whether to reroute the traffic scheduled for transmission via the second cell based on receiving the first CQI and the second CQI comprises:

determining a first data rate supported by the first cell based on receiving the first CQI;

determining a second data rate supported by the second cell based on receiving the second CQI; and determining that the second data rate supported by the second cell exceeds the first data rate supported by the first cell.

3. The method of claim 1, wherein the determining whether to reroute the traffic scheduled for transmission via the second cell based on receiving the first CQI and the second CQI comprises:

determining a traffic load distribution between the first cell and the second cell; and identifying one or more UEs served by the first cell that are candidates for offloading to the second cell based on determining the traffic load distribution, wherein the traffic load distribution is based on at least one of bandwidth utilization and bandwidth requirements of a plurality of UEs on each of the first cell and the second cell.

4. The method of claim 1, further comprising:

transmitting, from the second cell to the UE, the remaining portion of the traffic scheduled for transmission.

5. The method of claim 1, wherein receiving the first CQI and the second CQI comprises:

receiving, at the RNC, both the first CQI and the second CQI from the first cell, wherein the first cell is a serving cell and the second cell is candidate offloading cell.

6. The method of claim 1, wherein receiving the first CQI and the second CQI comprises receiving both the first CQI and the second CQI from the first cell or the second cell.

7. An apparatus for traffic management in a wireless communications system, comprising:

means for initiating, at a radio network controller (RNC), a transmission of a configuration that instructs a user equipment (UE) to transmit a first channel quality indicator (CQI) associated with a first cell having a first high speed downlink channel with the UE and a second CQI associated with a second cell having a second high speed downlink channel with the UE, and to decode traffic from one of the first cell and the second cell;

wherein the traffic is stored at the RNC and scheduled for transmission to the UE, and a portion of the traffic scheduled for transmission is routed by the RNC to the UE via the first cell; and wherein the first CQI and the second CQI are included in one or more CQI reports that are transmitted to each of the first cell and the second cell and wherein the first cell and the second cell filters the one or more CQI reports according to parameters and level of granularity identified by the RNC;

means for receiving, at the RNC, the first CQI and the second CQI with at least one of the first CQI and the second CQI including whether the UE is equipped with interference cancellation and suppression capabilities according to the parameters and the level of granularity identified by the RNC;

means for determining, at the RNC, whether to reroute the traffic scheduled for transmission to the UE via the second cell based on receiving the first CQI and the second CQI and whether the UE is equipped with interference cancellation and suppression capabilities; and means for rerouting a remaining portion of the traffic scheduled for transmission to the UE from the first cell to the second cell based on the determining, wherein said portion comprises queued traffic packets at the RNC.

8. The apparatus of claim 7, wherein the means for determining whether to reroute the traffic scheduled for transmission via the second cell based on receiving the first CQI and the second CQI comprises:

means for determining a first data rate supported by the first cell based on receiving the first CQI;

means for determining a second data rate supported by the second cell based on receiving the second CQI; and means for determining that the second data rate supported by the second cell exceeds the first data rate supported by the first cell.

9. The apparatus of claim 7, wherein the means for determining whether to reroute the traffic scheduled for transmission via the second cell based on receiving the first CQI and the second CQI comprises:

means for determining a traffic load distribution between the first cell and the second cell; and means for identifying one or more UEs served by the first cell that are candidates for offloading to the second cell based on determining the traffic load distribution, wherein the traffic load distribution is based on at least one of bandwidth utilization and bandwidth requirements of a plurality of UEs on each of the first cell and the second cell.

10. The apparatus of claim 7, further comprising:

means for transmitting, from the second cell to the UE, the remaining portion of the traffic scheduled for transmission.

11. The apparatus of claim 7, wherein means for receiving the first CQI and the second CQI comprises:

means for receiving, at the RNC, both the first CQI and the second CQI from the first cell, wherein the first cell is a serving cell and the second cell is candidate offloading cell.

12. An apparatus for traffic management in a wireless communications system, comprising:

a transceiver;

a memory configured to store instructions; and a processor communicatively coupled with the transceiver and the memory, the processor configured to execute the instructions to:

initiate a transmission of a configuration that instructs a user equipment (UE) to transmit a first channel quality indicator (CQI) associated with a first cell having a first high speed downlink channel with the UE and a second CQI associated with a second cell having a second high speed downlink channel with the UE, and to decode traffic from one of the first cell and the second cell;

wherein the traffic is stored at the RNC and scheduled for transmission to the UE, and a portion of the traffic scheduled for transmission is routed by the RNC to the UE via the first cell; and wherein the first CQI and the second CQI are included in one or more CQI reports that are transmitted to each of the first cell and the second cell and wherein the first cell and the second cell filters the one or more CQI reports according to parameters and level of granularity identified by the RNC;

receive, via the transceiver, the first CQI and the second CQI with at least one of the first CQI and the second CQI including whether the UE is equipped with interference cancellation and suppression capabilities according to the parameters and the level of granularity identified by the RNC;

determine whether to reroute the traffic scheduled for transmission to the UE via the second cell based on receiving the first CQI and the second CQI and whether the UE is equipped with interference cancellation and suppression capabilities; and reroute a remaining portion of the traffic scheduled for transmission to the UE from the first cell to the second cell based on the determining, wherein said portion comprise queued traffic packets at the RNC.

13. The apparatus of claim 12, wherein the processor is further configured to execute the instructions to:

determine a first data rate supported by the first cell based on receiving the first CQI; determine a second data rate supported by the second cell based on receiving the second CQI; and determine that the second data rate supported by the second cell exceeds the first data rate supported by the first cell.

14. The apparatus of claim 12, wherein the processor is further configured to execute the instructions to:

determine a traffic load distribution between the first cell and the second cell; and identify one or more UEs served by the first cell that are candidates for offloading to the second cell based on determining the traffic load distribution, wherein the traffic load distribution is based on at least one of bandwidth utilization and bandwidth requirements of a plurality of UEs on each of the first cell and the second cell.

15. The apparatus of claim 12, wherein the processor is further configured to execute the instructions to:

transmit, from the second cell to the UE, the remaining portion of the traffic scheduled for transmission.

16. The apparatus of claim 12, wherein the processor is further configured to execute the instructions to:

receive, via the transceiver, both the first CQI and the second CQI from the first cell, wherein the first cell is a serving cell and the second cell is candidate offloading cell.

17. A non-transitory computer-readable medium storing code executable by a computer for wireless communications, comprising:

code for initiating, at a radio network controller (RNC), a transmission of a configuration that instructs a user equipment (UE) to transmit a first channel quality indicator (CQI) associated with a first cell having a first high speed downlink channel with the UE and a second CQI associated with a second cell having a second high speed downlink channel with the UE, and to decode traffic from one of the first cell and the second cell;

wherein the traffic is stored at the RNC and scheduled for transmission to the UE, and a portion of the traffic scheduled for transmission is routed by the RNC to the UE via the first cell; and wherein the first CQI and the second CQI are included in one or more CQI reports that are transmitted to each of the first cell and the second cell and wherein the first cell and the second cell filters the one or more CQI reports according to parameters and level of granularity identified by the RNC;

code for receiving, at the RNC, the first CQI and the second CQI with at least one of the first CQI and the second CQI including whether the UE is equipped with interference cancellation and suppression capabilities according to the parameters and the level of granularity identified by the RNC;

code for determining, at the RNC, whether to reroute the traffic scheduled for transmission to the UE via the second cell based on receiving the first CQI and the second CQI and whether the UE is equipped with interference cancellation and suppression capabilities; and code for rerouting a remaining portion of the traffic scheduled for transmission to the UE from the first cell to the second cell based on the determining, wherein said portion comprises queued traffic packets at the RNC.

18. The non-transitory computer-readable medium of claim 17, wherein the code for determining whether to reroute the traffic scheduled for transmission via the second cell based on receiving the first CQI and the second CQI comprises:

code for determining a first data rate supported by the first cell based on receiving the first CQI;

code for determining a second data rate supported by the second cell based on receiving the second CQI; and code for determining that the second data rate supported by the second cell exceeds the first data rate supported by the first cell.

19. The non-transitory computer-readable medium of claim 17, wherein the code for determining whether to reroute the traffic scheduled for transmission via the second cell based on receiving the first CQI and the second CQI comprises:

code for determining a traffic load distribution between the first cell and the second cell; and code for identifying one or more UEs served by the first cell that are candidates for offloading to the second cell based on determining the traffic load distribution, wherein the traffic load distribution is based on at least one of bandwidth utilization and bandwidth requirements of a plurality of UEs on each of the first cell and the second cell.

* * * * *